United States Patent
Iwashita et al.

(10) Patent No.: US 8,018,747 B2
(45) Date of Patent: Sep. 13, 2011

(54) PWM RECTIFIER

(75) Inventors: Yasusuke Iwashita, Yamanashi (JP);
Tadashi Okita, Yamanashi (JP);
Masakazu Niwa, Yamanashi (JP); Kenta Yamamoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/642,180

(22) Filed: Dec. 18, 2009

(65) Prior Publication Data

US 2010/0214809 A1 Aug. 26, 2010

(30) Foreign Application Priority Data

Feb. 23, 2009 (JP) ................. 2009-039667

(51) Int. Cl.
*H02M 7/217* (2006.01)
*H02M 7/23* (2006.01)
(52) U.S. Cl. .................... 363/89; 363/127
(58) Field of Classification Search ............ 363/48, 363/77, 79–80, 89, 125–127
See application file for complete search history.

(56) References Cited

U.S. PATENT DOCUMENTS

| 4,847,743 A | 7/1989 | Kamiyama |
| 6,577,517 B2 * | 6/2003 | Jain et al. ................ 363/89 |

FOREIGN PATENT DOCUMENTS

| EP | 1978628 A2 | 10/2008 |
| JP | 63290170 A | 11/1988 |
| JP | 09-252581 A | 9/1997 |
| JP | 10-150779 A | 6/1998 |
| JP | 2004-048885 A | 2/2004 |
| JP | 2006-42579 A | 2/2006 |
| JP | 2006-254671 A | 9/2006 |
| JP | 2008259343 A | 10/2008 |

OTHER PUBLICATIONS

Notice of Reasons for Rejection from JPO regarding Japanese Patent Application No. 2009-039667, dated Jun. 29, 2010.

* cited by examiner

*Primary Examiner* — Gary L Laxton
*Assistant Examiner* — Nusrat J Quddus
(74) *Attorney, Agent, or Firm* — Lowe Hauptman Ham & Berner LLP

(57) ABSTRACT

Disclosed is a PWM rectifier in which switching losses in a semiconductor device are reduced without degrading the response of a control system. In a PWM overmodulation region, the modulation scheme is set to a three-phase modulation scheme. In other regions, a switchover condition such as the amplitude of an input current is acquired and compared with a switchover level. If the switchover condition equals or exceeds the switchover level, the modulation scheme is switched over to a modified two-phase modulation scheme which reduces the number of switching operations to two thirds for the same PWM frequency.

4 Claims, 8 Drawing Sheets

(a) R PHASE (b) S PHASE (c) T PHASE

PWM RECTIFIER

RELATED APPLICATIONS

The present application is based on, and claims priority from, Japanese Application Number 2009-039667 filed Feb. 23, 2009, the disclosure of which is hereby incorporated by reference herein in its entirety.

BACKGROUND OF THE INVENTION

1. Field of the Invention

The present invention relates to a pulse-width modulated (PWM) rectifier for converting a three-phase alternating current into a direct current by using a semiconductor device whose switching operation is controlled by a PWM signal.

2. Description of the Related Art

In a motor control apparatus that drives a machine tool, industrial machine, robot, or the like, a converter (rectifier) is used to convert commercial power into DC power then supplies the DC power to an inverter that drives the motor.

In recent years, rectifiers using pulse-width modulation (PWM) are being widely used because of the need to reduce power supply harmonics and reactive power. In a PWM rectifier, switching losses occur because high-speed switching is performed using a semiconductor device. Accordingly, this type of rectifier has the problem that, compared with conventional rectifiers based on diodes, losses in the power converter increase and the size of the converter thus increases.

To solve this problem, the prior art has employed a method that reduces the PWM frequency in regions where the amplitude of the current is large. This method is effective in reducing losses in the power converter and suppressing the increase in the converter size.

However, the prior art method has had the disadvantage that the response of the control system degrades because the feedback sampling period becomes longer as the PWM frequency decreases.

JP9-252581A discloses a method in which the carrier frequency of the rectifier (PWM converter) is varied. Further, JP2004-48885A and JP63-290170A each disclose a power converter that produces power from DC voltage by pulse modulation and supplies the power to a load, such as an electric motor, with provisions made to switch the modulation scheme between a three-phase modulation scheme and a two-phase modulation scheme (more properly, a modified two-phase modulation scheme: Refer to "PWM Power Conversion System" by Katsunori Taniguchi, Kyoritsu Publishing Co., Ltd, PP. 96-98). JP2008-259343A discloses a converter-inverter constructed by connecting an inverter to a converter, with provisions made to employ the modified two-phase modulation scheme as the PWM modulation scheme for either the converter or the inverter.

SUMMARY OF THE INVENTION

An object of the invention is to provide a PWM rectifier wherein switching losses in a semiconductor device are reduced without degrading the response of a control system.

According to the present invention, there is provided a pulse-width modulated (PWM) rectifier for converting a three-phase alternating current into direct current by using a semiconductor device which is controlled by a PWM signal, comprising: a control unit which generates the PWM signal in accordance with a three-phase modulation scheme in which a first PWM voltage command synchronized to the three-phase alternating current is created based on a difference between an output voltage of the PWM rectifier and a target value thereof and in which the PWM signal is generated by comparing the first PWM voltage command with a PWM carrier having a constant amplitude and constant frequency, or a modified two-phase modulation scheme in which the PWM signal is generated by comparing with the PWM carrier a second PWM voltage command created by saturating one phase selected from among three phases constituting the first PWM voltage command in the three-phase modulation scheme to a maximum or minimum value of the PWM and by applying an increase or decrease, required to achieve the saturation, to the other two phases; a detecting unit which detects at least one parameter selected from among an input current, output current, input power, and output power of the PWM rectifier and a temperature of the semiconductor device; and a modulation scheme switching unit which compares a detection value from the detecting unit with a predetermined threshold value and, if the detection value is larger than the threshold value, switches the modulation scheme used in the control unit from a three-phase modulation scheme to a modified two-phase modulation scheme.

In regions where current is relatively weak, the three-phase modulation scheme is employed in order to minimize current ripple, while in regions where the amplitude of the current is strong and heating (due to switching losses) becomes a problem, the modulation scheme is switched to the modified two-phase modulation scheme, thereby reducing the number of switching operations to two thirds for the same PWM frequency, and the switching losses thus decrease.

DESCRIPTION OF THE PREFERRED EMBODIMENTS

Figure 1:
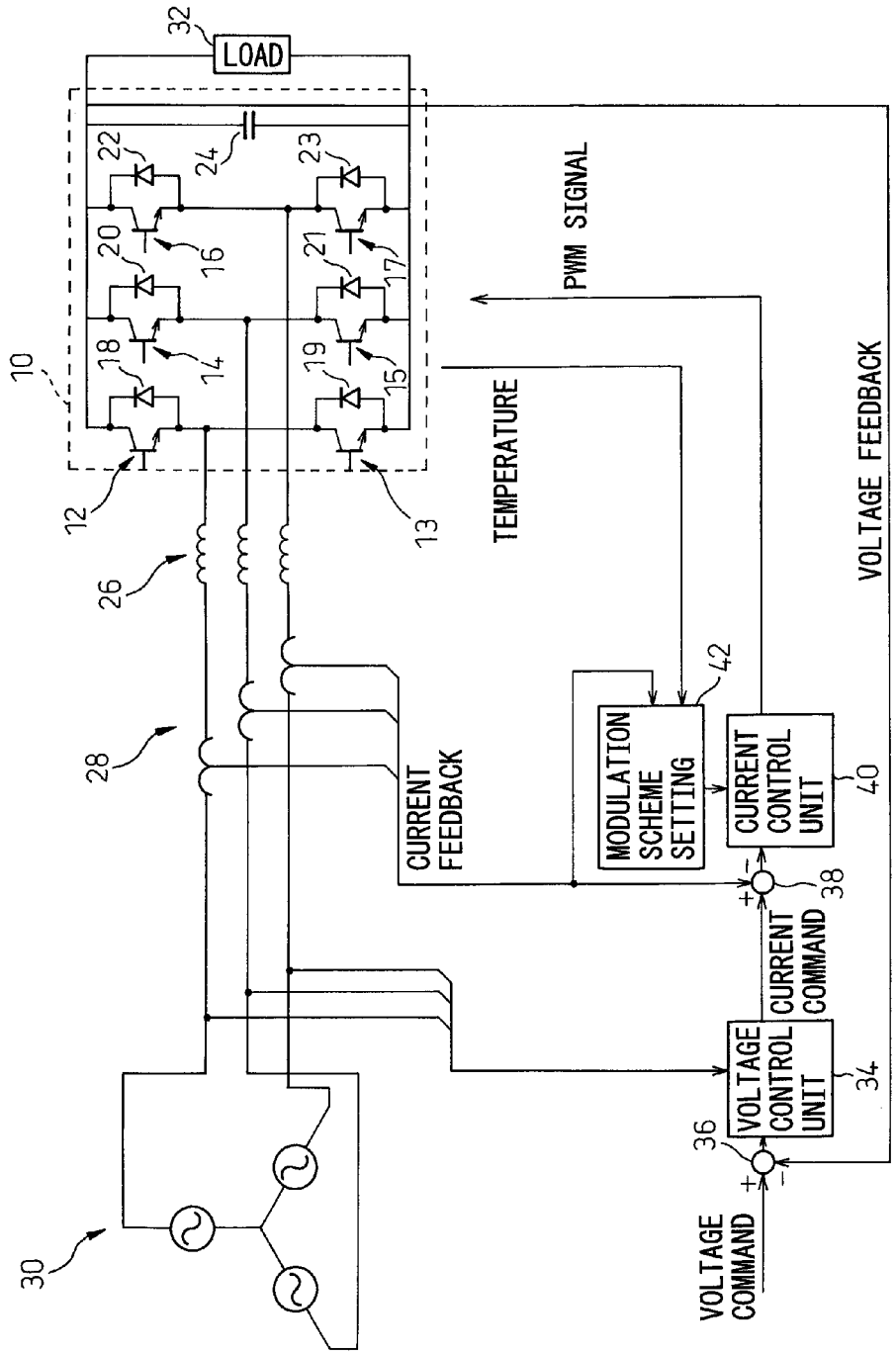
FIG. 1 is a block diagram showing the configuration of a PWM rectifier according to one embodiment of the present invention.

FIG. 1 is a block diagram showing the configuration of a PWM rectifier according to one embodiment of the present invention.

In the PWM rectifier, a main circuit section 10 includes transistors 12 to 17, diodes 18 to 23, and a smoothing capacitor 24 connected as shown. The input side of the main circuit section 10 is connected to a three-phase power supply 30 via an AC reactor 26 and a current transformer 28, and the output side is connected to a load 32 such as a PWM inverter.

An adder 36 outputs a difference (voltage difference) representing the deviation of the output voltage of the PWM rectifier, i.e., the voltage across the smoothing capacitor 24, from a voltage command. A voltage control unit 34 takes as inputs the voltage difference supplied from the adder 36 and the voltage from the three-phase power supply 30, and outputs a current command which is a signal synchronized to the three-phase power supply and having an amplitude proportional to the voltage difference. An adder 38 outputs a difference (current difference) representing the deviation of the current detected at the current transformer 28 from the current command.

When the modulation scheme selected by a modulation scheme setting unit 42 is a three-phase modulation scheme, a current control unit 40 takes the current difference itself as a PWM voltage command, compares it with a PWM carrier having a constant amplitude and constant frequency, and outputs the result of the comparison as a PWM signal for controlling the transistors 12 to 17. On the other hand, when the modulation scheme selected by the modulation scheme setting unit 42 is a modified two-phase modulation scheme, the PWM voltage command generated in accordance with the modified two-phase modulation scheme as will be described later is compared with the PWM carrier, and the result of the comparison is output as the PWM signal.

Figure 2:
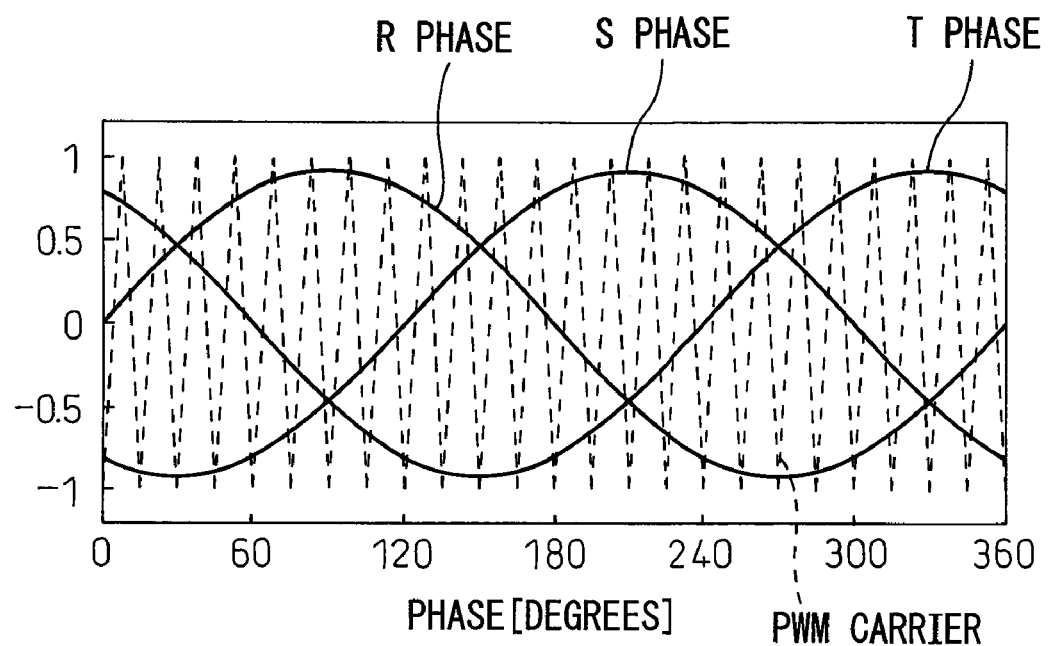
FIG. 2 is a waveform diagram explaining how a PWM signal is generated by comparing a PWM voltage command with a PWM carrier.

Referring to FIG. 2, a description will be given of how the PWM signal is generated by comparing the PWM voltage command with the PWM carrier. In FIG. 2, PWM voltage commands for R phase, S phase, and T phase in the three-phase modulation scheme are indicated by solid lines, and the PWM carrier to be compared with them is indicated by a dashed line. The PWM voltage command for each phase is compared with the triangular-wave PWM carrier, and if the PWM voltage command is larger, the upper transistor 12, 14, or 16 in FIG. 1 is turned on and the lower transistor 13, 15, or 17 is turned off; on the other hand, if the PWM voltage command is smaller, the lower transistor 13, 15, or 17 is turned on and the upper transistor 12, 14, or 16 is turned off. As the value of the PWM voltage command for each phase varies, the ON period of each transistor connected to that phase varies; that is, as the value of the PWM voltage approaches the maximum value of the PWM carrier, the ON period of the upper transistor connected to that phase increases, and as it approaches the minimum value, the ON period of the lower transistor connected to that phase increases.

In PWM modulation, the modulation percentage (PWM modulation percentage) is defined by the following equation.

$$\text{PWM modulation percentage (\%)} = (\text{Amplitude of PWM voltage command})/(\text{Amplitude of PWM carrier}) \times 100 \quad (1)$$

Figure 3:
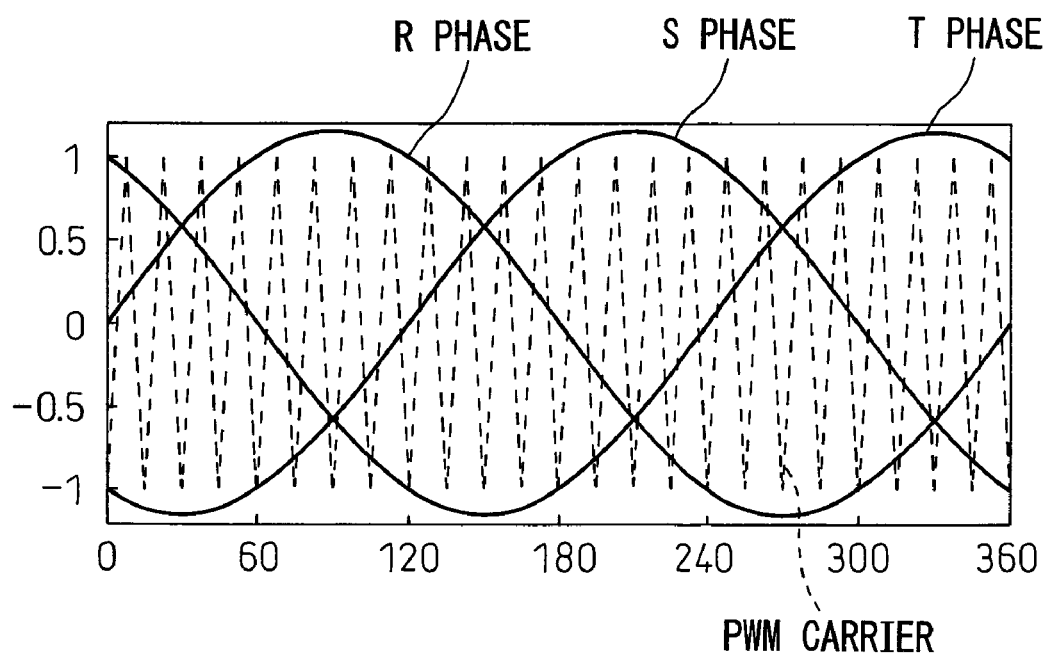
FIG. 3 is a waveform diagram explaining modulation percentage and overmodulation.

In PWM overmodulation regions where the PWM modulation percentage exceeds 100%, as shown in FIG. 3, the number of switching operations decreases because the switching stops in the section where the PWM voltage command is larger than the maximum value of the PWM carrier as well as in the section where the PWM voltage command is smaller than the minimum value of the PWM carrier. In the example of FIG. 3, for R phase, for example, the PWM voltage command exceeds the maximum value in the section where the phase is 60° to 120°, and becomes smaller than the minimum value in the section where the phase is 240° to 300°, and the switching stops in these sections.

Figure 4:
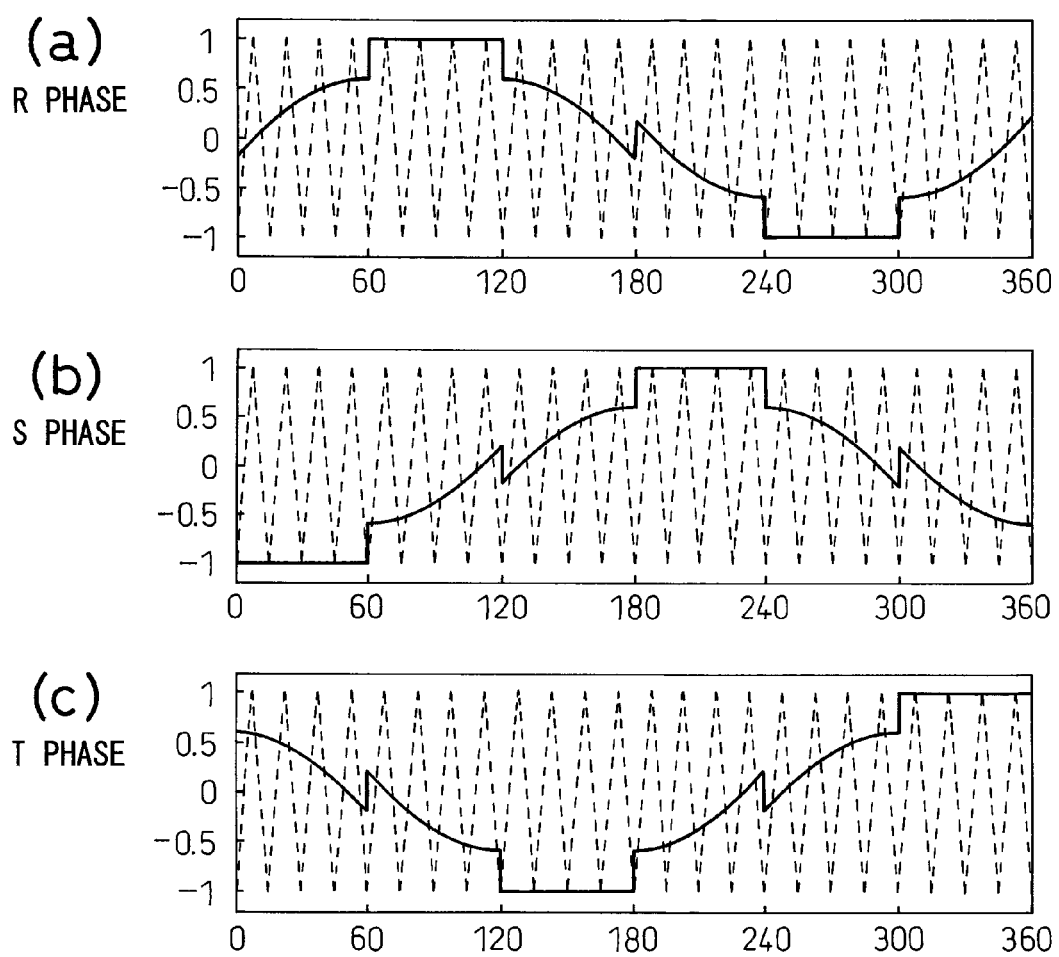
FIG. 4 is a waveform diagram explaining one example of a modified two-phase modulation scheme.

Next, the modified two-phase modulation scheme will be described. In the modified two-phase modulation scheme, the PWM voltage command for one of the three phases in the three-phase modulation is saturated to the maximum or minimum value of the PWM carrier, and the resulting increase or decrease is equally applied to the other two phases to create the respective PWM voltage commands. In the example shown in FIG. 4, in the section where the phase is 0° to 60°, the PWM voltage command for S phase in part (b) of the figure is saturated to the minimum value of the PWM carrier and, in the section where the phase is 60° to 120°, the PWM voltage command for R phase in part (a) is saturated to the maximum value of the PWM carrier. Since, in any section, one of the three phases is saturated to the maximum or minimum value of the PWM carrier, and the switching stops, the number of switching operations of the transistors 12 to 17 decreases to two thirds of that in the three-phase modulation scheme, and the switching losses thus decrease.

Figure 5:
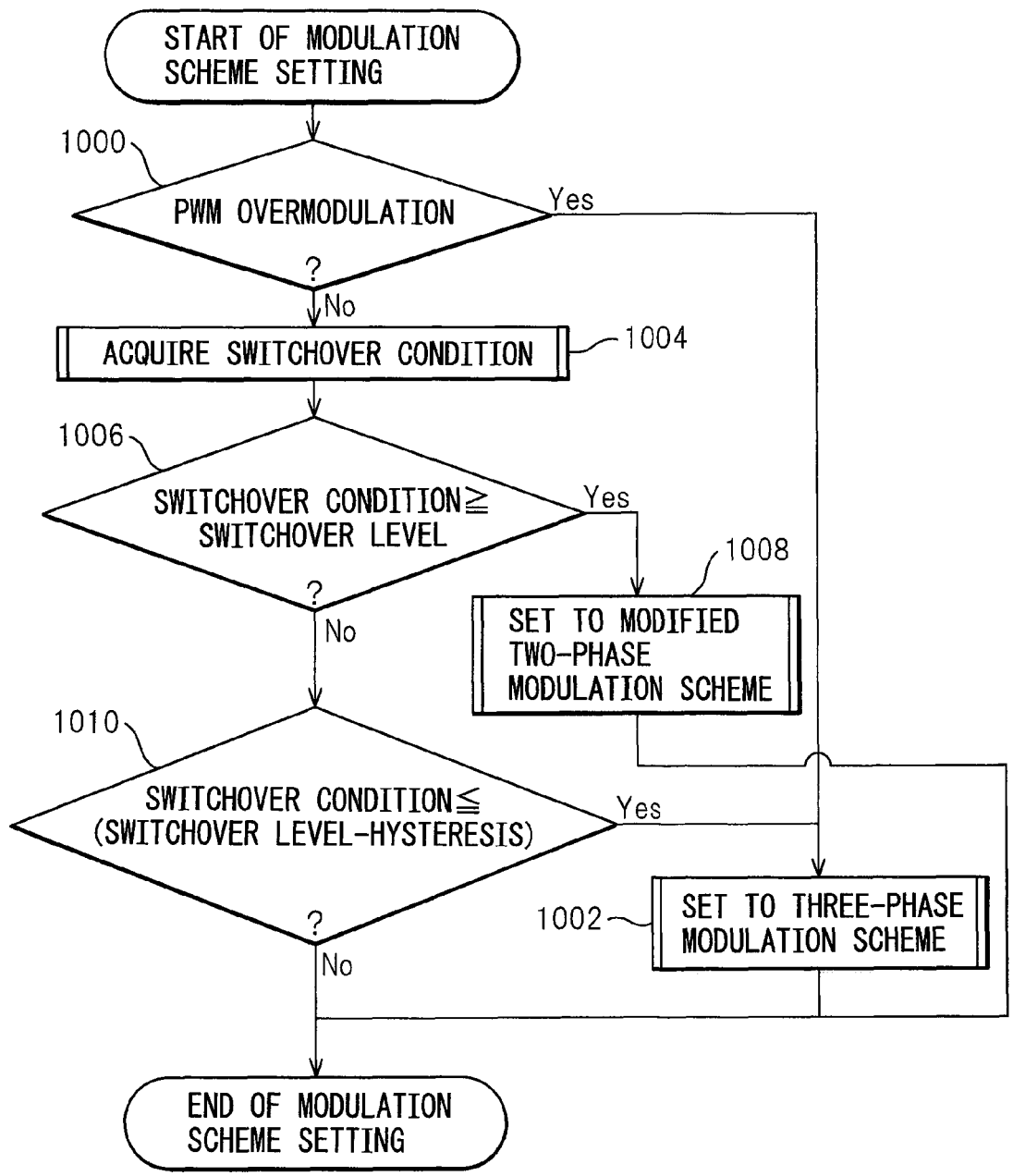
FIG. 5 is a flowchart illustrating a modulation scheme setting procedure.

FIG. 5 shows one example of a modulation scheme setting procedure in the modulation scheme setting unit 42 (FIG. 1). In the initial state, the three-phase modulation scheme which reduces current ripple is selected as the modulation scheme. In the modulation scheme setting procedure, first the modulation percentage defined by equation (1) is checked whether it exceeds 100% or not, i.e., whether it is in the PWM overmodulation state or not (step 1000); if it is in the PWM overmodulation state, the modulation scheme is set to the usual three-phase modulation scheme (step 1002).

If it is not in the PWM overmodulation state, then the condition based on which to effect switchover to the modified two-phase modulation scheme is acquired (step 1004), and the acquired switchover condition is compared with a switchover level (step 1006). If the acquired switchover condition equals or exceeds the switchover level, the modulation scheme is set to the modified two-phase modulation scheme (step 1008). Next, the switchover condition is compared with (switchover level—hysteresis) (step 1010); if the former is equal to or less than the latter, the modulation scheme is set to the three-phase modulation scheme. That is, hysteresis is provided in the switchover decision step performed using the switchover condition.

The switchover condition is preferably the amplitude of the input current acquired by the current transformer in FIG. 1. If the amplitude of the input current is stronger than the amplitude switchover level, switching is made to the modified two-phase modulation scheme, but if it is not stronger than (switchover level—hysteresis), switching is made to the three-phase modulation scheme. Alternatively, the switchover condition may be selected from among the amplitude of the input current, the temperature acquired from a temperature sensor (not shown) provided near the transistors 12 to 17, the output current acquired from a current sensor not shown, the input power, and the output power, or a combination of some of these switchover conditions may be used. When making a switchover decision using a combination of a plurality of decision conditions, it is preferable to make provisions so that if any one of the decision conditions exceeds its corresponding decision level, switching is made to the modified two-phase modulation scheme, and if none of the decision conditions exceed their corresponding (switchover level—hysteresis) values, switching is made to the three-phase modulation scheme.

In the above example, the usual three-phase modulation scheme is employed in regions where the current amplitude is weak; however, a scheme that superimposes on the voltage command a compensation signal having a frequency three times that of the voltage command, i.e., a scheme generally known as the third harmonic injection scheme, may be employed.

Figure 6:
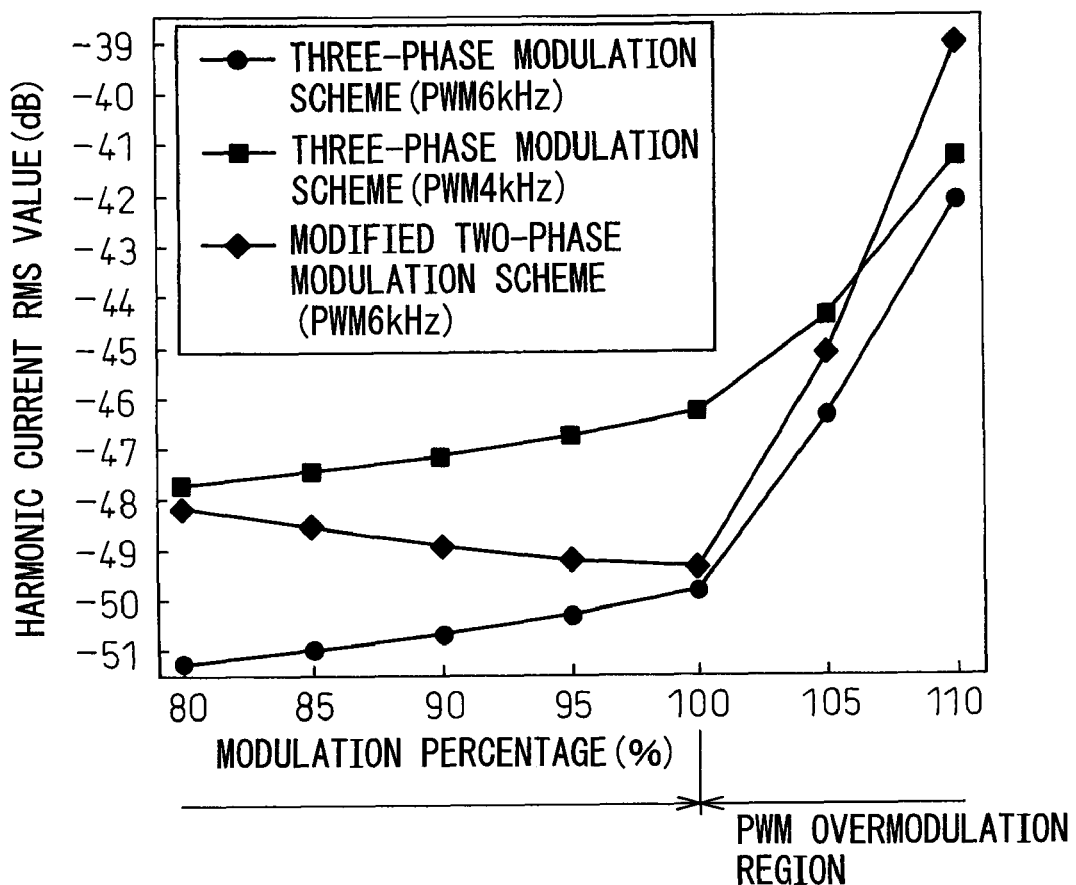
FIG. 6 is a graph showing the relationship between the modulation percentage and the harmonic current rms value in the three-phase modulation scheme and the modified two-phase modulation scheme for comparison.

FIG. 6 shows a relationship, derived through simulation, between the modulation percentage and the harmonic current rms value in the three-phase modulation scheme and the modified two-phase modulation scheme for comparison. Since the number of switching operations in the modified two-phase modulation scheme decreases to two thirds of that in the three-phase modulation scheme, the number of switching operations in the modified two-phase modulation scheme for a PWM frequency of 6 kHz is equivalent to that in the three-phase modulation scheme for a PWM frequency of 4 kHz. However, as shown in FIG. 6, in the PWM overmodulation region where the modulation percentage exceeds 100%, the characteristic degrades in the modified two-phase modulation scheme compared with the three-phase modulation scheme. It will, however, be noted that in the PWM overmodulation region, the number of switching operations decreases even in the three-phase modulation scheme, as earlier described with reference to FIG. 3.

It is therefore desirable to maintain the three-phase modulation scheme in the PWM overmodulation region even if the switchover condition exceeds the switchover level, as described with reference to FIG. 5.

Figure 7:
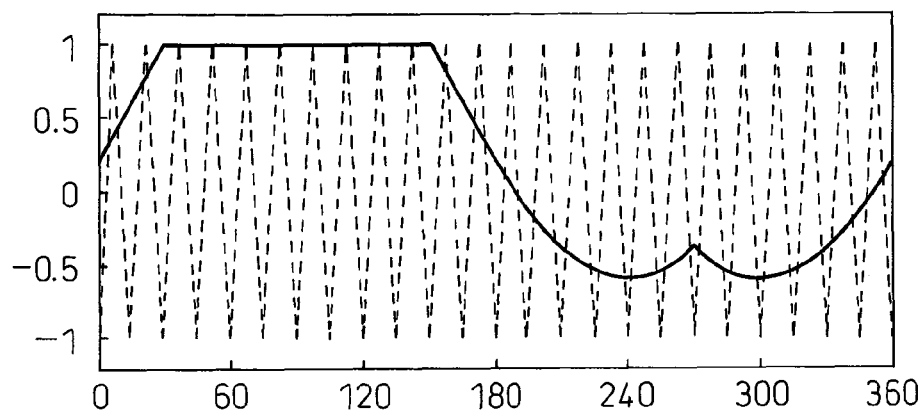
FIG. 7 is a waveform diagram explaining a second example of the modified two-phase modulation scheme.
Figure 7:
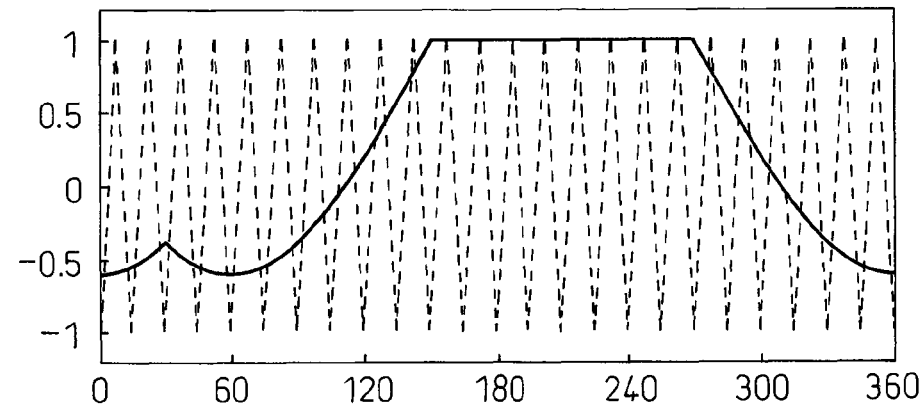
Figure 7:
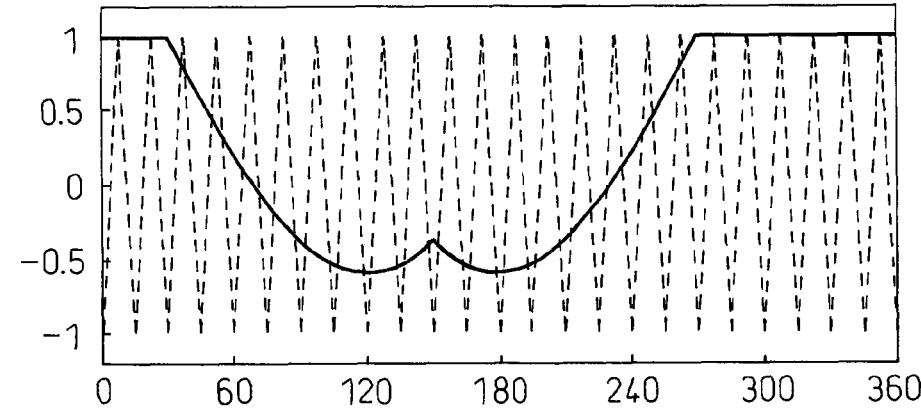
Figure 8:
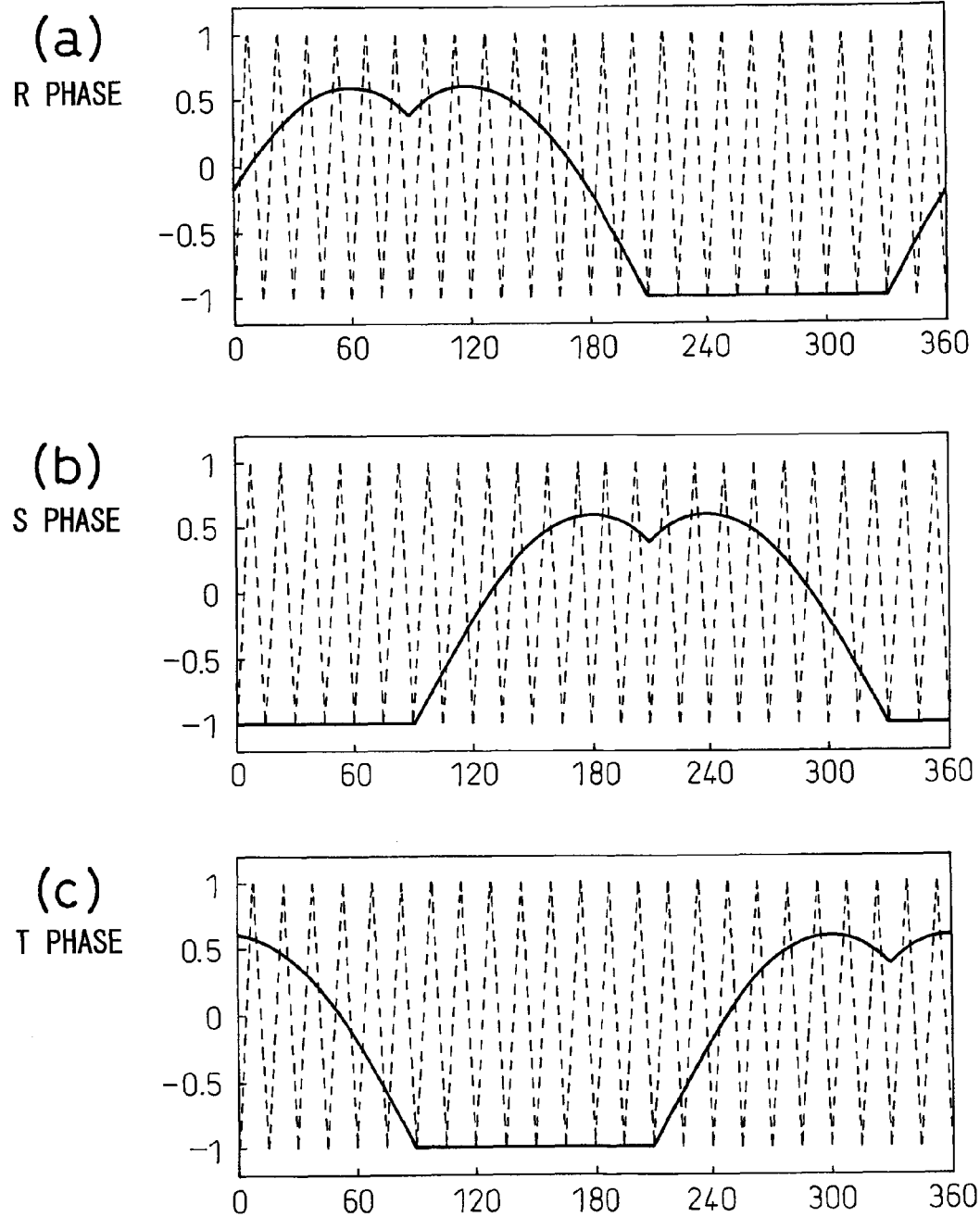
FIG. 8 is a waveform diagram explaining a third example of the modified two-phase modulation scheme.
Figure 9:
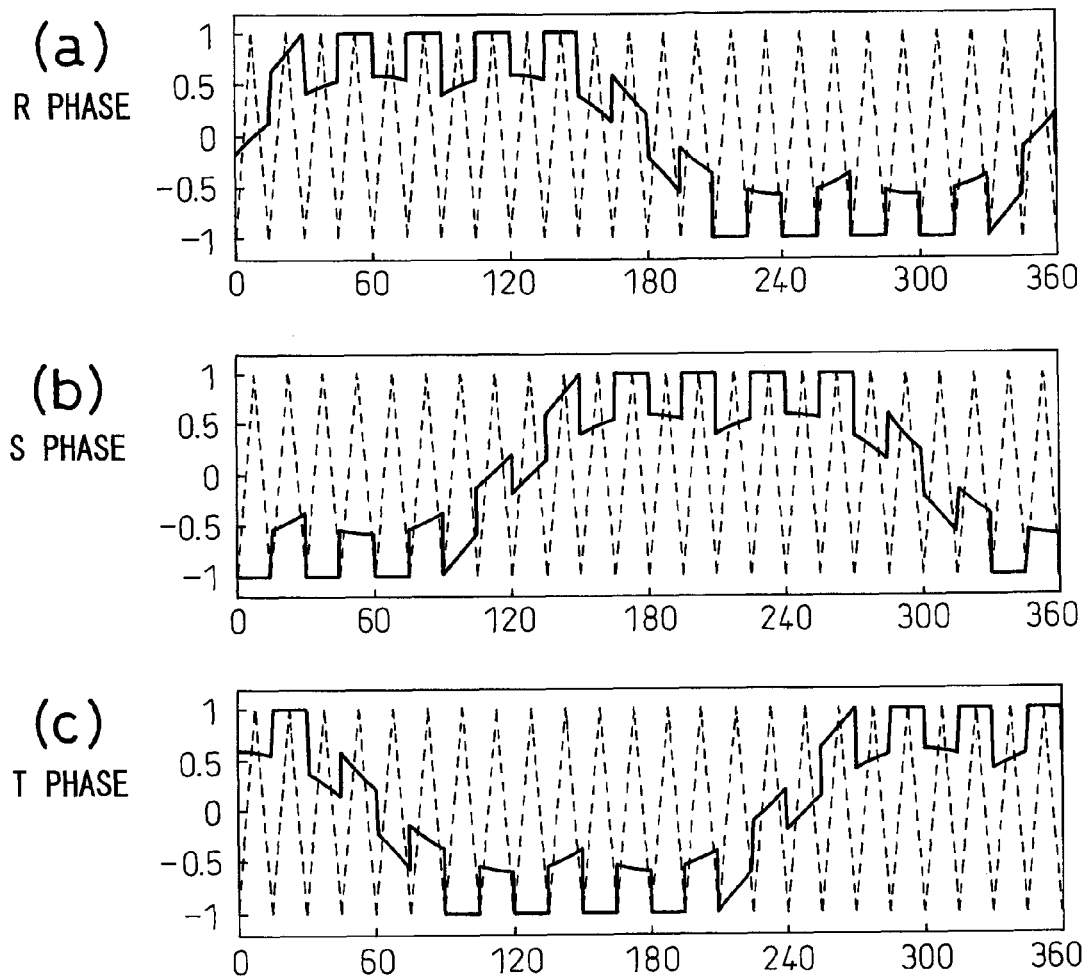
FIG. 9 is a waveform diagram explaining a fourth example of the modified two-phase modulation scheme.

FIGS. 7 to 9 show other examples of the modified two-phase modulation scheme. In the example shown in FIG. 7, of the PWM voltage commands for R phase, S phase, and T phase, the strongest voltage command is saturated to the level equivalent to the maximum value of the PWM carrier, and the resulting increase is applied to the other two phases. In the example shown in FIG. 8, of the PWM voltage commands for R phase, S phase, and T phase, the weakest voltage command is saturated to the level equivalent to the minimum value of the PWM carrier, and the resulting decrease is applied to the other two phases. In the example shown in FIG. 9, the process of saturating the strongest voltage command to the level equivalent to the maximum value of the PWM carrier, as shown in FIG. 7, and the process of saturating the weakest voltage command to the level equivalent to the minimum value of the PWM carrier, as shown in FIG. 8, are repeated alternately. While FIG. 9 shows that the repetition period is set twice the period of the carrier and the two are synchronized to each other, the repetition period need not be set twice or an integral multiple of the period of the carrier or it is not necessary that they synchronized to each other.

The invention claimed is:

1. A pulse-width modulated (PWM) rectifier for converting a three-phase alternating current input into a direct current output, comprising:
a semiconductor device configured to receive the three-phase alternating current input and to output the direct current output according to a set of PWM signals;
a control unit configured to generate said set of PWM signals in accordance with a three-phase modulation scheme in which a first set of PWM voltage commands synchronized to said three-phase alternating current input is created based on a difference between an output voltage of said PWM rectifier and a target value thereof, said set of PWM signals is generated by comparing said first set of PWM voltage commands with a PWM carrier having a constant amplitude and constant frequency, or a modified two-phase modulation scheme in which said set of PWM signals is generated by comparing a second set of PWM voltage commands with said PWM carrier, the second set of PWM voltage commands being created by saturating one phase selected from among three phases constituting said first set of PWM voltage commands in said three-phase modulation scheme to a maximum or minimum value of said PWM carrier and by applying an increase or decrease, required to achieve said saturation, to the other two phases of said first set of PWM voltage commands;
a detecting unit configured to detect at least one parameter selected from among an input current, output current, input power, and output power of said PWM rectifier or a temperature of said semiconductor device; and
a modulation scheme switching unit configured to compare a detection value from said detecting unit with a predetermined threshold value and, if said detection value is larger than said threshold value, to switch the modulation scheme to be used in said control unit from said three-phase modulation scheme to said modified two-phase modulation scheme,
said modulation scheme switching unit being configured to select said three-phase modulation scheme as the modulation scheme to be used in said control unit irrespective of the result of the comparison between said detection value and said threshold value if a PWM modulation percentage is equal to or larger than a predetermined value, where the PWM modulation percentage is a ratio of an amplitude of said first set of PWM voltage commands in said three-phase modulation scheme to the amplitude of said PWM carrier.

2. The pulse-width modulated (PWM) rectifier of claim 1, wherein the semiconductor device comprises:
two transistors connected in series between a first output power line and a second output power line of the semiconductor device for each phase of the three-phase alternating current input; and
one diode connected to one of the two transistors, the diode being connected between a source and a drain of the corresponding transistor.

3. A method of controlling a pulse-width modulated (PWM) rectifier having a main circuit, a control unit, and a modulation scheme switching unit for converting a set of three-phase alternating current (AC) signals into a direct current (DC) signal, the method comprising:
receiving a first set of PWM voltage commands synchronized to the set of three-phase AC signals, the first set of PWM voltage commands being generated according to a difference between a voltage level of the DC signal and a target voltage level;
selecting, by the modulation scheme switching unit, a three-phase modulation scheme as a selected modulation scheme if a PWM modulation percentage is equal to or larger than a predetermined value, the PWM modulation percentage being a ratio of an amplitude of the first set of PWM voltage commands to an amplitude of a PWM carrier having a constant amplitude and constant frequency;
detecting a parameter corresponding to a current level of the set of three-phase AC signals, a power level of the set of three-phase AC signals, a current level of the DC signal, a power level of the DC signal, or a temperature of the main circuit;
selecting, by the modulation scheme switching unit, the three-phase modulation scheme as a selected modulation scheme if the detected parameter is larger than a threshold value and if the PWM modulation percentage is smaller than the predetermined value;
selecting, by the modulation scheme switching unit, a two-phase modulation scheme as a selected modulation scheme if the detected parameter is not larger than the threshold value and if the PWM modulation percentage is smaller than the predetermined value; and generating, by the control unit, a set of PWM signals for controlling the main circuit according to the selected modulation scheme, the PWM carrier, and the first set of PWM voltage commands.

4. The method of claim 3, wherein the generation of the set of PWM signals comprises:

generating the set of PWM signals by comparing the first set of PWM voltage commands with the PWM carrier if the three-phase modulation scheme is selected; and generating a second set of PWM voltage commands by level-shifting the first set of PWM voltage commands to saturate one of the set of first PWM voltage commands corresponding to one phase of the three-phase AC signals and generating the set of PWM signals by comparing the second set of PWM voltage commands with the PWM carrier, if the two-phase modulation scheme is selected.

\* \* \* \* \*